No. 729,202.  
Patented May 26, 1903.

UNITED STATES PATENT OFFICE.

HANS MOLCHIN, OF ST. LOUIS, MISSOURI.

COMPOSITION OF MATTER.

SPECIFICATION forming part of Letters Patent No. 729,202, dated May 26, 1903.

Application filed October 29, 1902. Serial No. 129,319. (No specimens.)

*To all whom it may concern:*

Be it known that I, HANS MOLCHIN, a subject of the Emperor of Germany, residing at St. Louis, State of Missouri, have invented certain new and useful Improvements in Compositions of Matter, of which the following is a specification.

My invention has relation to improvements in compositions of matter to be used for purposes of a fireproof brick in buildings, partition-walls, linings of framework, and the like; and it consists in the novel composition to be more fully set forth in the specification and pointed out in the claims.

The composition consists of an intimate mixture of calcined gypsum or calcium sulfate, ordinarily termed "plaster-of-paris," coal-cinders, mica, and slaked lime in proportions as follows: forty-five parts, by weight, of plaster-of-paris; fifty parts, by weight, of coal-cinders; two parts, by weight, of mica; three parts, by weight, of slaked lime. The plaster-of-paris is first ground, and the coal-cinders are reduced to small particles and sifted, and the mica is comminuted, after which the slaked lime is added and sufficient water is mixed to give the mass the consistency of thick cream to enable the same to be poured into molds, which impart the necessary shape or configuration to the brick.

It is of course immaterial what the character of coal is from which the cinders are derived, as this does not in any wise affect the general nature of the composition of the final product. The plaster-of-paris of course causes the material to set after being poured into the mold, the final hardening of the brick being due to the presence of this material.

Having described my invention, what I claim is—

1. A composition comprising a mixture of plaster-of-paris, coal-cinders, mica and slaked lime, substantially as specified.

2. A composition comprising a mixture of pulverized plaster-of-paris, sifted coal-cinders, comminuted mica, and slaked lime, substantially as specified.

3. A composition comprising a mixture of forty-five parts of pulverized plaster-of-paris, fifty parts of sifted coal-cinders, two parts of comminuted mica, and three parts of slaked lime, the whole hardened and set, substantially as set forth.

In testimony whereof I affix my signature in presence of two witnesses.

HANS MOLCHIN.

Witnesses:
 W. C. KILLEN,
 ROBERT LUCAS.